United States Patent [19]
Lake

[11] Patent Number: 6,065,609
[45] Date of Patent: May 23, 2000

[54] BEVERAGE BREWING KIT

[76] Inventor: Reginald W. Lake, 128 Shelter Lagoon Dr., Santa Cruz, Calif. 95060

[21] Appl. No.: 08/633,649

[22] Filed: Apr. 17, 1996

[51] Int. Cl.[7] .............................. B01D 29/05; A47J 31/06
[52] U.S. Cl. .............................. 210/474; 99/295; 99/306; 206/0.5; 206/217; 426/82; 210/497.3
[58] Field of Search .................................. 210/451, 474, 210/497.3; 426/77, 82, 86, 115, 433, 435, 84, 112; 99/295, 306; 206/0.5, 217; 220/630; 26/477

[56] References Cited

U.S. PATENT DOCUMENTS

| | | | |
|---|---|---|---|
| 136,703 | 3/1873 | Childs | 99/306 |
| 571,474 | 11/1896 | Grandjean | 210/451 |
| 846,748 | 3/1907 | Klell | 210/451 |
| 3,615,708 | 10/1971 | Abile-Gal . | |
| 4,027,582 | 6/1977 | O'Connell | 99/306 |
| 4,069,751 | 1/1978 | Gronwick et al. | 99/306 |
| 4,150,608 | 4/1979 | Hirschberg | 99/306 |
| 4,163,374 | 8/1979 | Moore et al. | 62/457.3 |
| 4,167,136 | 9/1979 | Chupurdy | 99/306 |
| 4,402,195 | 9/1983 | Campbell | 62/457.4 |
| 4,417,504 | 11/1983 | Yamamoto | 99/306 |
| 4,627,334 | 12/1986 | Shanklin | 99/306 |
| 5,147,540 | 9/1992 | Hagan | 426/77 |
| 5,398,842 | 3/1995 | Sokolski | 220/630 |
| 5,424,083 | 6/1995 | Lozito | 426/77 |
| 5,605,710 | 2/1997 | Pridonoff et al. | 99/306 |

FOREIGN PATENT DOCUMENTS 1289610  8/1962  France .

OTHER PUBLICATIONS

Copy of Swiss Gold "Cup o'coffee" package; Manufactured by Elfo, Switzerland. On sale, on or before Sep. 6, 1995; Starbuck's Cofee Company, U.S.A.

Primary Examiner—Joseph W. Drodge
Attorney, Agent, or Firm—Joseph E. Gerber

[57] ABSTRACT

A hot beverage brewing kit comprised of a double-walled cup and a cylindrical filter support stowable between the cup's walls is disclosed. A retaining ring secures a cone-shaped textile fabric filter to the filter support. The filter stows in a space between the bottom of the cup's fluid containing cavity and the cup's lower end cover. An upper end cover engages the cup's single-walled upper rim, and has a drinking aperture therein. An alternative embodiment of the kit includes a modified cup which has its outer bottom wall and outer side wall formed as an integral structure. A threaded joint toward the upper end of the outer side wall joins the integral outer bottom and side walls to the upper and inner portions of the modified cup.

15 Claims, 6 Drawing Sheets

BEVERAGE BREWING KIT

BACKGROUND OF THE INVENTION

1. Field of the Invention

The present invention relates generally to drinking vessels, and more specifically to kits for brewing single servings of hot beverages such as coffee or tea.

2. Description of the Related Art

Single-cup hot beverage brewing devices provide a practical alternative to multi-cup brewing apparatus in instances when it would be wasteful or too time consuming to brew more than a single beverage serving. And, single-cup brewing kits can be especially handy for travelling if they are compact and include all of the necessary elements for making the desired beverage.

Most commonly, single-cup coffee brewing devices include a funnel-like structure with a filter, and a lower flange adapted to support the structure above a drinking vessel. Use involves placing an amount of ground coffee above the filter and pouring hot water thereover such that the brewed beverage drips into the vessel below. Filters are either planar and horizontally-oriented, or conical; and, they are most commonly constructed of paper, although metal mesh is also often used. Perhaps the simplest example of this genera is the single-cup version of the currently ubiquitous Melita brand drip coffee brewing system which comprises a base plate with an upstanding, generally frusto-conical support for a cone-shaped paper filter adapted to receive ground coffee. The device of U.S. Pat. No. 4,167,136 issued to Chupurdy in 1979 is similar, but includes a perforated, water flow-regulating member above the filter. The Melita and Chupurdy devices are at least as tall and wide as the drinking vessels atop which they are intended to be set. This makes them a bit inconvenient to pack for travel, as does the need to carry the cup, the filter holder, the filters and the ground coffee all separately.

Yamamoto, in U.S. Pat. No. 4,417,504 issued in 1983, discloses a kit which has mating shells, one of which serves as a drinking cup and the other of which, when nested atop the first, serves as the filter support. When mated in opposed fashion the shells act as a convenient container for carrying coffee and filters, and other such coffee making accoutrements as sugar, powdered milk and a spoon. However, when packed this way for travel, the kit is twice the size of its own drinking cup.

Somewhat more compact single-cup coffee brewing devices are shown in U.S. Pat. No. 4,027,582 issued to O'Connell in 1977, and in U.S. Pat. No. 4,069,751 issued to Gronwick, et al. in 1978. Each includes a cup and a mating filter apparatus thereabove adapted to retain coffee grounds and regulate water flow. However, neither achieves the compactness of a coffee cup alone.

Shanklin, in U.S. Pat. No. 4,627,334 issued in 1986, shows a single-cup coffee brewing kit with all of its elements nested compactly into its own cup. Shanklin includes: a cylindrical support for a paper filter; a cylindrical, water-receiving vessel adapted to be perched thereabove; and, a container for ground coffee, all being respectively concentrically nestable. However, the Shanklin kit is overly complex, and likely unreasonably expensive. Further, when Shanklin's water-receiving vessel is stacked atop the filter support, which is in turn stacked above the drinking cup, the entire apparatus is quite tall and appears sufficiently unstable as to be dangerous, especially when the water-receiving vessel is full of extremely hot water.

In addition to the stated limitations, none of the foregoing devices is well adapted to brewing loose tea, as this requires that the tea leaves be suspended for a time beneath the surface of the brewing water rather than, as with coffee, having the water pass briefly thereover. Thus, to add tea-making capabilities to the foregoing without resorting to less economical tea bags, a conventional tea ball or other tea brewing apparatus would have to be added.

Accordingly, it appears that a need exists for a simple, compact, single-cup beverage brewing kit, which is stable and safe to use, and inexpensive to manufacture. And, it would also be advantageous if such a kit had loose tea-brewing capability, as well as coffee-brewing capability, without adding substantial extra weight or complexity to the kit, and without taking up extra space. Yet further, it would be desirable if the use of disposable paper filters could be avoided, as only a limited number thereof may be reasonably carried and, additionally, they pose disposal problems and are rather wasteful of resources. But, rigid metal mesh filters are not ideal either because, if conical, they take up too much space, and, if flat, they require means for wetting and controlling the flow of hot water over a broad surface of coffee grounds.

SUMMARY OF THE INVENTION

The beverage brewing kit of the present invention is adapted to overcome the above-noted shortcomings and to fulfill the stated needs. It includes a double-walled drinking vessel wherein a space between the walls is employed to house, in concentric fashion, a tubular filter support. A cover at the vessel's lower end, when removed, permits the filter support to be withdrawn and set atop the vessel. A collapsible conical filter, supportable upon the upper end edge of the filter support, depends into the filter support's interior when it is atop the vessel and filled with coffee. This filter is stowable, whether attached to or separate from the filter support, within a space in the lower portion of the vessel covered by the lower end cover. The filter is also separately useable for brewing loose tea, as it may be lowered directly into hot water in the vessel along with a quantity of tea leaves for steeping. During nonuse, the entire fluid cavity within the vessel remains available for storing brewing materials.

Thus, it is an object of the present invention to provide a single-cup beverage brewing kit which is simple and inexpensive to manufacture.

And, it is a further object of the present invention to provide a single-cup beverage brewing kit which achieves superior economy in space and weight, while being versatile enough for brewing either coffee or tea.

Yet another object of this invention is to provide a single-cup beverage brewing kit which is stable and safe to use, even while the filter support is set atop the vessel and receiving hot water.

Yet a further object of the present invention is to provide a single-cup beverage brewing kit which avoids the use of single-use disposable paper filters.

Still further objects of the inventive single-cup beverage brewing kit disclosed herein will be apparent from the drawings and following detailed description thereof.

DESCRIPTION OF THE PREFERRED EMBODIMENTS

Figure 1:
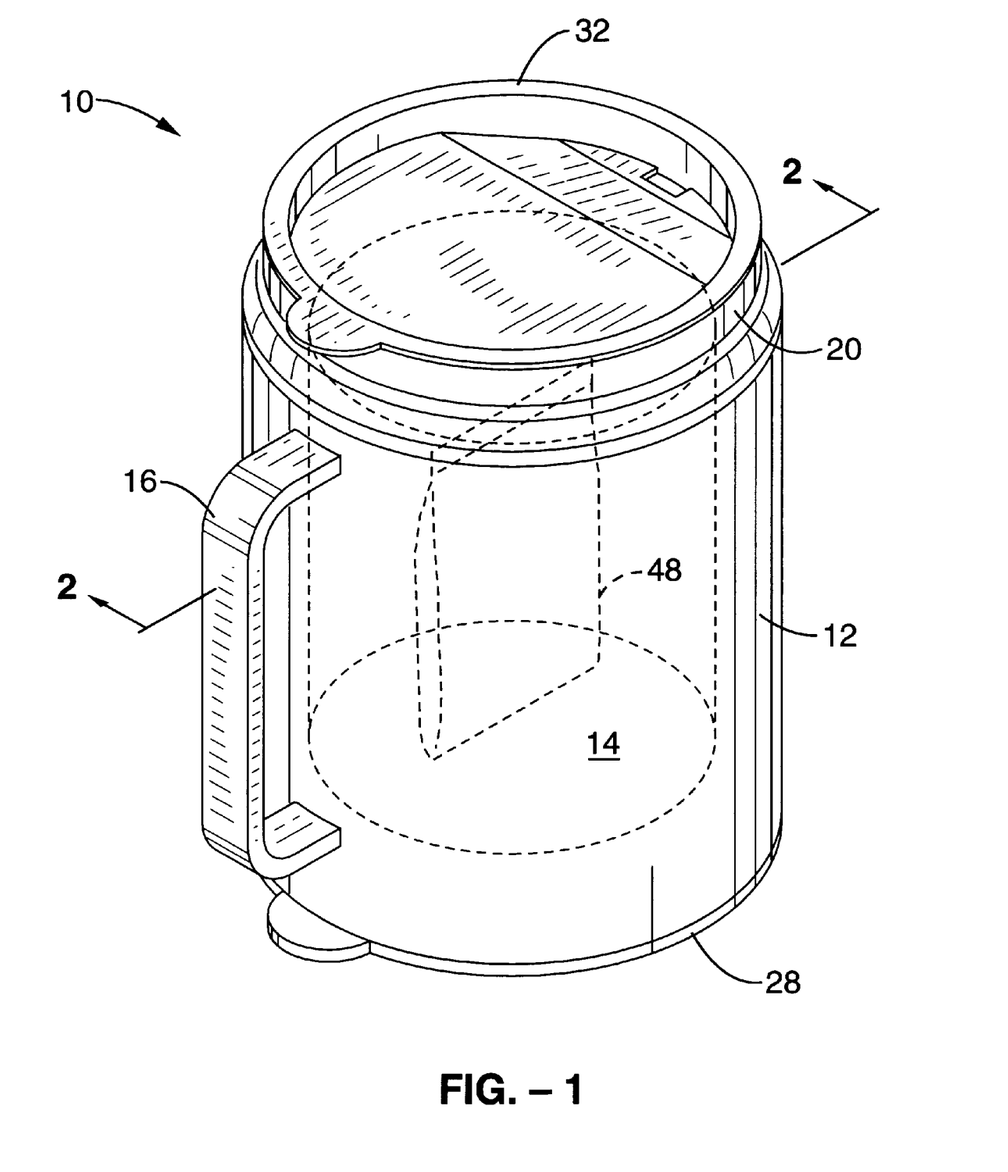
FIG. 1 is a perspective view of the cup portion of the brewing kit of the invention, showing the orientation of its interior cavity, with a bag of brewable material stowed therewithin.
Figure 2:
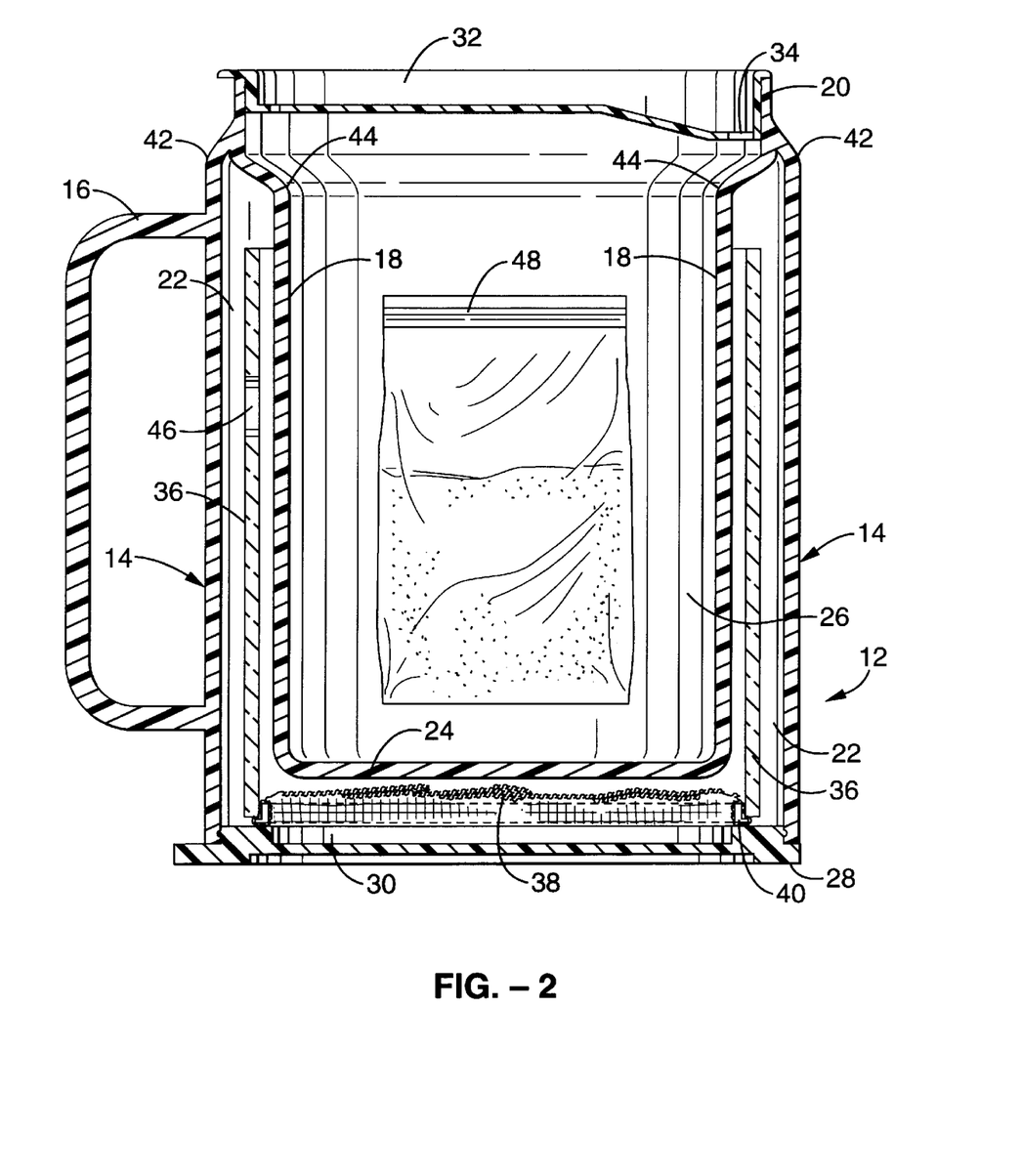
FIG. 2 is a cross-sectional view of the brewing kit of the invention, taken on lines 2—2 of FIG. 1, showing all of the kit's elements nested therewithin.
Figure 3:
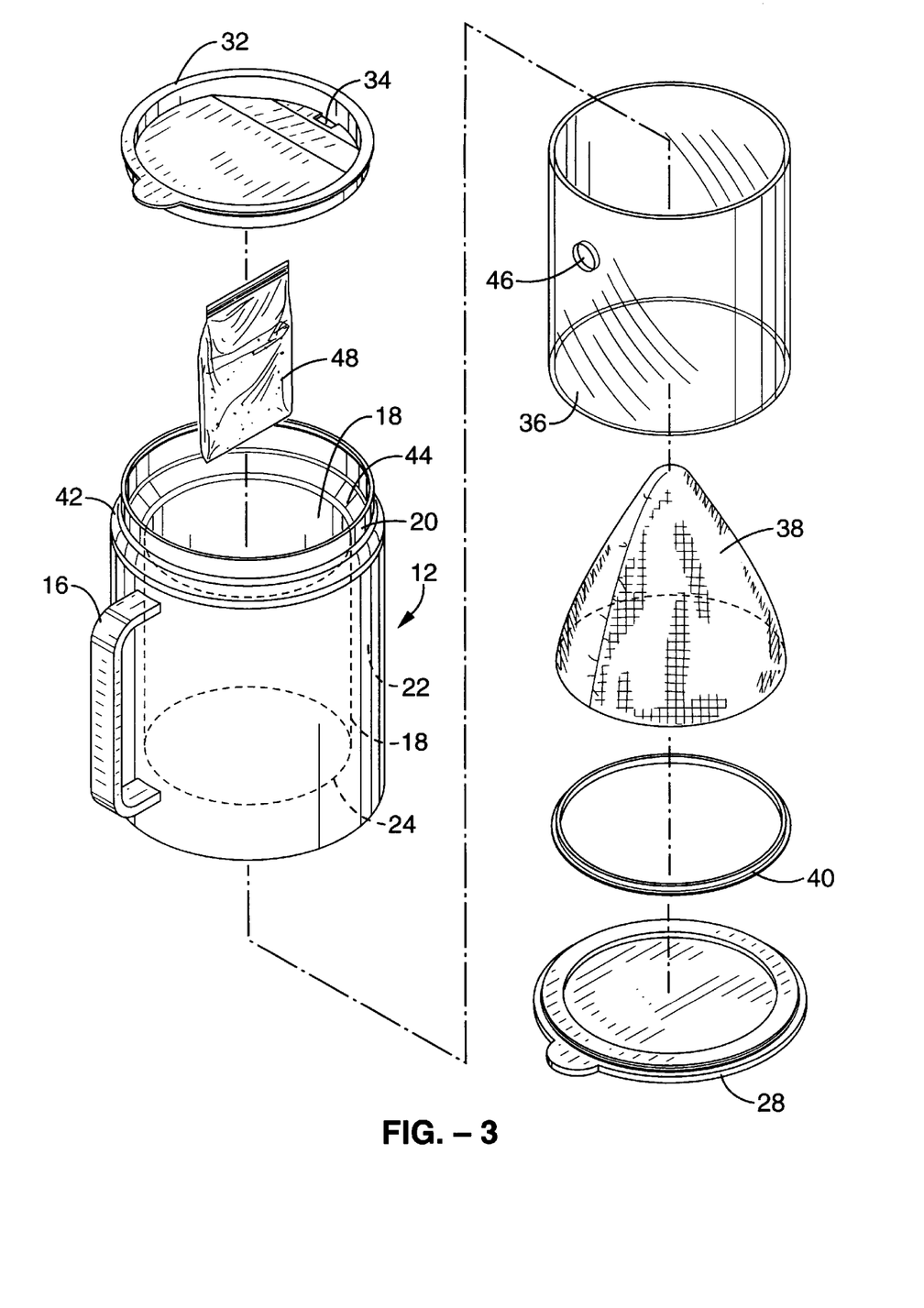
FIG. 3 is an exploded perspective view of the elements of the brewing kit of the invention.

Referring now specifically to the drawings, FIGS. 1, 2 and 3 show the inventive single-cup beverage brewing kit which is generally identified herein with the reference numeral 10. Kit 10 first includes a drinking cup 12 which is a double-walled vessel.

Outer side wall 14 is generally cylindrical and includes projecting handle 16. Inner side wall 18 is concentric with, and spaced apart from, outer side wall 14. The upper end edges of outer side wall 14 and inner side wall 18 are joined into an integral, annular, single-walled upper rim 20 at the upper end of cup 12. Cylindrically-shaped space 22 between outer and inner side walls 14 and 18 has its upper terminus beneath upper rim 20, and is open at the lower end of cup 12.

Outer side wall 14 is longer than inner side wall 18 and extends a short distance therebeyond at cup 12's lower end.

Bottom wall 24 is transverse to, and contiguous with, inner side wall 18, such that these, together, form and define a central cavity 26 within cup 12 able to contain fluid. Lower end cover 28 is generally disc-shaped and engages the annular lower end edge of outer side wall 14. As shown in FIG. 2, when lower end cover 28 is engaged with outer side wall 14's annular lower end edge, a space 30 between cover 28 and bottom wall 24 is defined.

Upper end cover 32 is generally disc-shaped and engages annular upper rim 20. When in place, upper end cover 32 serves to define the upper extent of central cavity 26. A peripherally-disposed drinking aperture 34 for delivering fluid from cavity 26 is provided in upper end cover 32.

A double-walled plastic cup with upper and lower end covers, available through Whirley Industries, Inc. of Warren, Pa., and identified thereby as Thermo Mug model number T-99, has been found satisfactory for use in practicing the invention. However, other existing or specially-constructed vessels may work as well or better for this purpose.

Filter support 36 is a substantially rigid, tubular, preferably transparent, plastic member with opposed, parallel, annular end edges, and is shaped and dimensioned to fit within space 22 between outer and inner side walls 14 and 18. As shown in FIG. 2, filter support 36 is long enough such that, when nested between walls 14 and 18, it projects slightly beyond bottom wall 24. But, filter support 36 should not be so long as to inhibit secure engagement of lower end cover 28 with the lower end edge of outer side wall 14. Filter support 36 may also be substantially shorter than inner side wall 18 and still function for its intended purpose.

Filter 38 is conical in shape and comprised of textile fabric. White polyester fabric is preferred. A product available from New York Fabrics of Hudson, Ohio, identified as "hang loose polyester" under SKU# 1423706, has been found to work satisfactorily for the purposes of the invention. However, it is contemplated that fabrics of other compositions, or other woven or nonwoven materials having similar flexibility, durability and filtering ability, may perform sufficiently well, or better, in practicing the invention.

Filter 38 may be constructed in any manner known to produce a generally conical shape. Satisfactory results have been achieved by beginning with a circular piece of fabric; cutting it into equal, pie-shaped thirds; and, folding each upon itself with a single seam to form each into a cone-shaped filter. Seams may be constructed by sewing, welding or application of adhesives, as would be known in the art of the filter material chosen. And, filter 38's dimensions should be such that, when its periphery is bound to an end edge of upstanding filter support 36 with filter retaining ring 40, or when otherwise supported upon support 36 by any other means, filter 38's apex depends substantially into filter support 36's interior.

Filter retaining ring 40 is somewhat resilient and is preferably shaped and dimensioned to bind the outer periphery of cone-shaped filter 38 to an end edge of filter support 36 with a close frictional fit. In the drawing figures, retaining ring 40 is shown to be roughly L-shaped in cross-section and dimensioned to fit snugly to the inside diameter of an end edge of filter support 36, although other conventional engaging shapes may be employed. Filter 38 is preferably removable from both filter support 36 and retaining ring 40 for cleaning, repair or replacement.

However, it should also be understood that if filter 38 were bound permanently to filter support 36, this would still fall within the spirit of the invention. It is also contemplated that filter 38 may be bound more or less permanently to filter retaining ring 40, such that they may be removed together as a unit from filter support 36. Further, either ring 40 or the end edge of filter support 36, or both, may be shaped and dimensioned for an interlocking fit, such as with a detent, or the like. And, the periphery of filter 38 may or may not be intended to lie between such interlocking portions of retaining ring 40 and filter support 36. Yet further, filter 38 could be fashioned with a peripheral hem able to receive a retaining ring which would reside therewithin. And, that ring may be adapted for engagement with, or merely to be supported by, filter support 36.

Figure 5:
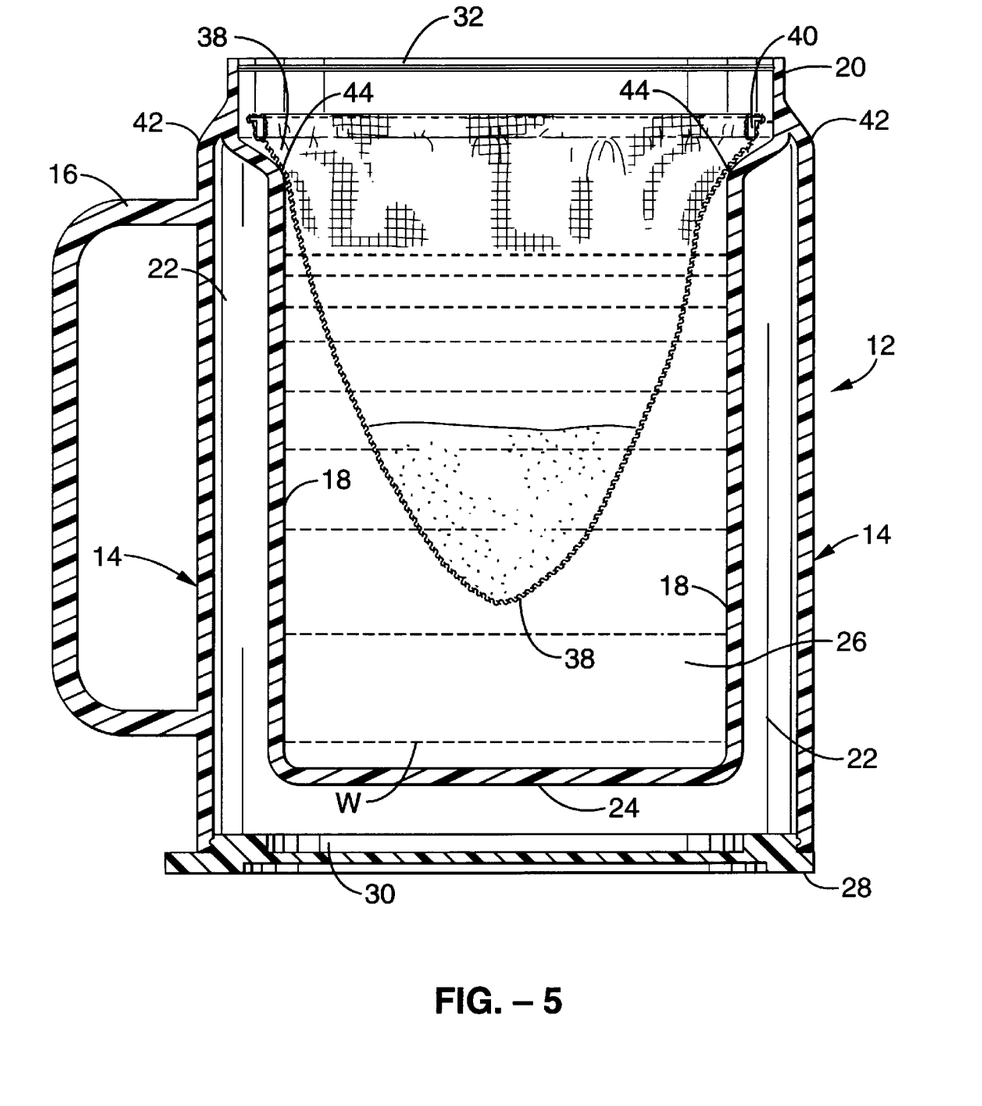
FIG. 5 is a cross-sectional view of the kit's conical filter suspended into the interior of the cup, as when brewing loose tea.

Filter retaining ring 40, in any of the afore-suggested configurations where it is removable from filter support 36, may additionally be shaped and dimensioned for stable seating atop cup 12, or even for secure engagement with upper rim 20. As shown in FIG. 5, with ring 40 so seated or engaged, filter 38's apex would depend substantially into cup 12's central cavity.

The second end of filter support 36, i.e. that end opposing the end with filter 38, is adapted to mate with an upper portion of cup 12 when upper end cover 32 is removed. This mating relationship may be accomplished in any conventional manner, such as by giving filter support 36's end a size and/or shape which causes it to seat on either exterior or interior shoulders, 42 and 44 respectively, of cup 12 just below rim 20. Of course, seating upon interior shoulder 44 is preferred in order to minimize leakage. Ideally, the inside diameter of upper rim 20 is just large enough to accommodate the outside diameter of filter support 36, and interior shoulder 44 of cup 12 is formed as part of the upper extent of cylindrical space 22 between outer and inner side walls 14 and 18, which is dimensioned to house filter support 36 when stowed. Thus, filter support 36 would fit equally well into space 22 and into the inside diameter of upper rim 20. But, alternatively, other conventional means for engagement between filter support 36 and the upper portion of cup 12 may be employed. And, these may include securing means such as threads, detents, or the like, on either cup 12 or filter support 36. Further, a reduced thickness adjacent the free edge of either rim 20 or filter support 36, or of both, such as by introduction of an L-shaped cut thereto, would permit these two elements to be engaged with one another in a manner wherein their end edges overlap, without relying on support from shoulders 42 or 44.

It should be understood that each of the opposed ends of filter support 36 may be differently shaped in order for one end to accommodate filter 38 and retaining ring 40, and for the other to engage upper rim 20, or some other upper portion of cup 12. Alternatively, filter support 36 may have like ends, and each may be able to mate equally well with either filter 38 and retaining ring 40, or some upper portion of cup 12.

Filter support 36 also preferably includes an aperture 46 somewhere below its midlength. Aperture 46 serves to permit easy inspection of the beverage level in cup 12 during the brewing operation, as the inside of transparent filter support 36 tends to fog up with vapor from hot beverages. Aperture 46 also eliminates the tendency of filter 38 to be driven upward, i.e. inside-out, by the heat and steam.

Figure 4:
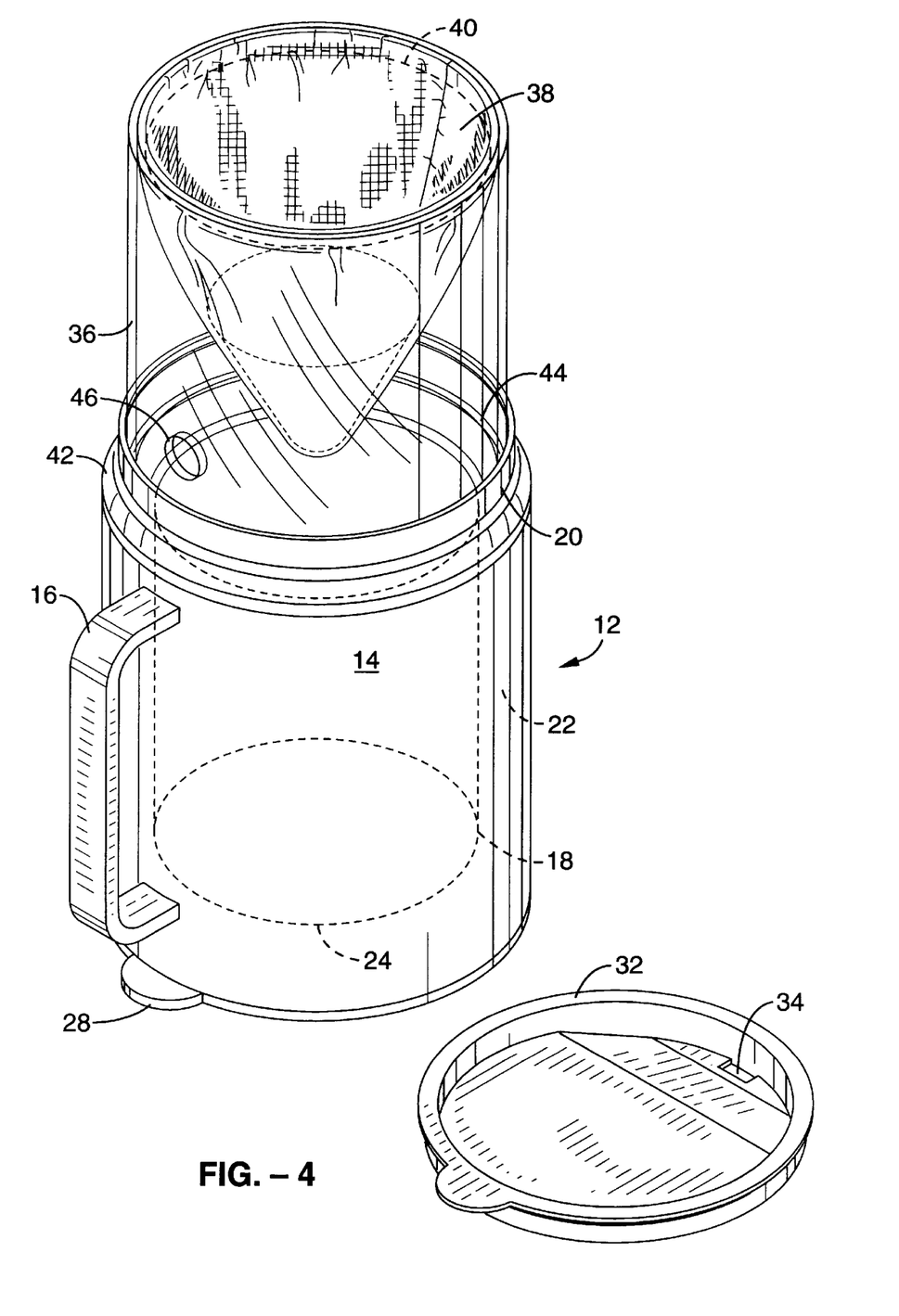
FIG. 4 is a perspective view of the brewing kit of the invention in use, showing the filter support engaged with the upper end of the drinking vessel, as when brewing coffee.

In use, kit 10 may be pre-packed with a resealable bag 48 of coffee, tea or another brewable beverage. Bag 48 is conveniently carried in central cavity 26. To prepare for the coffee brewing operation, lower end cover 28, upper end cover 32 and bag 48 are removed. Filter support 36, filter 38 and retaining ring 40 are withdrawn from spaces 22 and 30, and filter support 36 is placed atop cup 12, as described and as shown in FIG. 4. Filter 38, if not already engaged with the upper end of filter support 36, is now engaged therewith, with the aid of retaining ring 40. Ground coffee, or other brewable material of the type best brewed in drip fashion, is poured from bag 46 into filter 38, seating at its apex. While watching the fluid level in cavity 26 through aperture 46, hot water is poured over the brewable material until cup 12 is full. Then, filter support 36 and filter 38 are set aside to cool. Filter 38 may be cleaned and rinsed after being removed from, or while remaining attached to, filter support 36. Filter 38 is preferably dried before being stowed within space 30. If two filters are regularly kept with the kit, one may be immediately stowed, while the other may be left to dry.

If desired, filter support 36, filter 38 and retaining ring 40 may be stowed in spaces 22 and 30, and held in place with lower end cover 28 while the beverage in the cup is being consumed. This may be preferred as these elements, when stowed, increase the insulating capacity of cup 12. To best retain the heat of the beverage, upper end cover 32 is preferably engaged with upper rim 20, and delivery of the beverage is made through drinking aperture 34. Of course, the beverage may also be consumed without either lower end cover 28 or upper end cover 32 in place.

In brewing loose tea or other beverages which must be steeped in hot water for a time, rather than being drip-brewed, filter 38 and retaining ring 40 may be removed from filter support 36 and used separately. Filter 38 is partially filled with the brewing material, and is then lowered into hot water W already in cup 12. Ring 40 at the periphery of filter 38 rests atop cup 12 as shown in FIG. 5. Alternatively, filter 38 may be placed atop cup 12 as shown in FIG. 5, and then cup 12 may be filled by pouring the hot water over the brewing material. The filter and brewing material are left in cup 12 to steep, as desired.

As yet another alternative, if filter 38 is permanently bound to filter support 36, or if it is otherwise desired that these elements remain engaged while steeping tea or like beverages, filter support 36 may simply be inverted so that filter 38 depends into cup 12's central cavity 26, rather than into filter support 36's interior.

Cleaning, re-stowing and use of kit 10's elements after steeping tea, or the like, are as described above.

Figure 6:
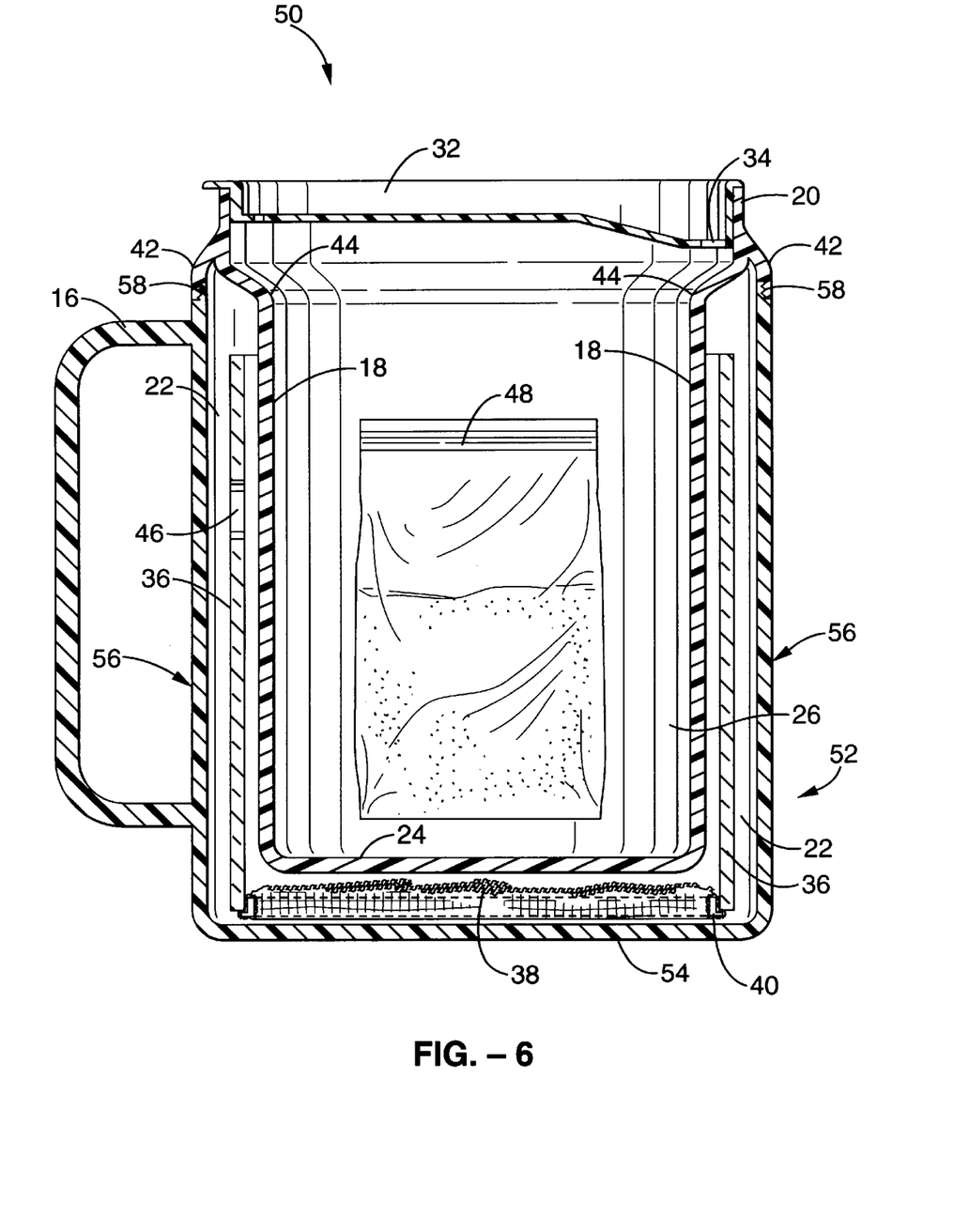
FIG. 6 is a cross-sectional view of an alternative embodiment of the kit of the invention, wherein the outer bottom wall and outer side wall are an integral structure.

An alternative embodiment of the inventive kit is shown in FIG. 6, and identified herein with reference numeral 50. Alternative kit 50 includes modified cup 52 which has its outer bottom wall 54 and outer side wall 56 formed as an integral structure. Joint 58 toward the upper end of outer side wall 56, above handle 16, joins and permits selective disengagement of, integral outer bottom wall 54 and outer side wall 56 with the upper and inner portions of cup 52. Joint 58 is shown as threads just below exterior shoulder 42; but, joint 58 may, alternatively, comprise other engaging means such as a snap-together detent ring. Upper rim 20, inner side wall 18 and inner bottom wall 24 of modified cup 52 are of essentially the same structure as those in cup 12 of first-described kit 10.

The choice of the material from which cup 52 is fashioned will dictate to one skilled in the art which type of conventional engaging means will work best for joint 58. Once joint 58 is disengaged, integral outer bottom wall 54 and outer side wall 56, along with handle 16, may serve as a separate vessel, as may the inner portion of cup 52, which is comprised of integral inner side wall 18 and bottom wall 24.

Filter support 36 is nestable between inner side wall 18 and outer side wall 56, and it is retained therewithin by bottom wall 54. Alternative kit 50, with cup 52, otherwise, operates in the same manner as kit 10.

The foregoing detailed disclosure of the inventive beverage brewing kit 10 is considered as only illustrative of the preferred embodiment of, and not a limitation upon the scope of, the invention. Those skilled in the art will envision many other possible variations of the structure disclosed herein that nevertheless fall within the scope of the following claims. For example, except if threaded as in cup 52, the elements described herein do not need to be circular in cross section. Any shape cross section such as square, triangular, etc. will suffice, as long as all of the elements nest and engage as described. And, a joint anywhere along the inner and outer side walls permitting inner and outer vessels to be separated from one another for separate use, and for nesting a filter support and other accouterments therebetween, will fall within the invention.

Further, the cups, filter supports, end covers and other such elements of the inventive kit's embodiments are shown in the drawings as if they were constructed of plastic. However, it should be understood that in manufacturing these elements, other materials such as ceramics, or metals such as aluminum or stainless steel, or yet other materials now known or later discovered, may be preferable for certain purposes. And, it should be further understood that variations in the structure disclosed herein, which are made necessary by the utilization of alternative construction materials, and which would be within the ability of a person ordinarily skilled in these arts to make, will nevertheless fall within the scope of the invention.

Other beverage brewing accoutrements are also envisioned as being included in either kit 10 or kit 50. For example, a hand-operated coffee bean grinder of sufficiently small dimensions to fit within central cavity 26 is considered to be within the scope of the claims.

And, alternative uses for this inventive kit may later be realized. Accordingly, the scope of the invention should be determined with reference to the appended claims, and not by the examples which have herein been given.

I claim:

1. A beverage brewing kit, comprising:
   a. a vessel comprising:
      i. an upper end and a lower end;
      ii. generally cylindrical, concentric inner and outer walls with a space therebetween; and,
      iii. means for covering said lower end of said vessel;
   b. a tubular filter support nested within said space between said inner and outer walls;
   c. a filter stowed in a space covered by said lower end covering means; and,
   d. means for suspending said filter from a first end edge of said tubular filter support.

2. The kit of claim 1, wherein said tubular filter support has a second end edge constructed and arranged to mate with said upper end of said vessel.

3. The kit of claim 1, wherein said filter suspending means comprises an annular member constructed and arranged for engagement with said filter and with said first end edge of said tubular filter support.

4. The kit of claim 1, further including means for supporting said filter at said vessel's upper end such that a portion of said filter depends substantially into an interior cavity of said vessel.

5. A beverage brewing kit, comprising:
   a. a vessel comprising:
      i. an upper end and a lower end;
      ii. generally cylindrical, concentric inner and outer walls with a space therebetween, upper end edges of said inner and outer walls being joined to one another;
      iii. a bottom wall contiguous with a lower end edge of said inner wall, said bottom wall and said inner wall defining a central cavity within said vessel able to contain fluid; and,
      iv. means engageable with a lower end edge of said outer wall for covering said lower end of said vessel;
   b. a tubular filter support, shorter than said generally cylindrical outer wall, and constructed and arranged to nest within said space between said inner and outer walls, and further constructed and arranged to be retained therewithin by said lower end covering means;
   c. a flexible, collapsible, generally conical filter constructed and arranged to be stowed in a space between said bottom wall and said lower end covering means; and,
   d. means for suspending said filter from a first end edge of said tubular filter support.

6. The kit of claim 5, further including means for covering said upper end of said vessel.

7. The kit of claim 5, further including means stowable within said cavity for containing brewable material.

8. The kit of claim 5, further including means for supporting said filter at said vessel's upper end such that a portion of said filter depends substantially into said central cavity of said vessel.

9. The kit of claim 5, wherein said tubular filter support has a second end edge constructed and arranged to mate with said upper end of said vessel.

10. The kit of claim 9, wherein when said second end edge of said tubular filter support is mated with said upper end of said vessel, and when said filter is suspended from said tubular filter support's first end edge, said filter depends substantially into said tubular filter support.

11. The kit of claim 5, wherein said filter suspending means comprises an annular member constructed and arranged for engagement with said filter and with said first end edge of said tubular filter support.

12. The kit of claim 11, wherein said annular member is also constructed and arranged for engagement with said upper end of said vessel and, when so engaged, said filter depends substantially into said vessel's central cavity.

13. The kit of claim 5, further including an inspection aperture in said tubular filter support.

14. A beverage brewing kit, comprising:
   a. a vessel comprising:
      i. an upper end and a lower end;
      ii. an inner portion comprising an inner side wall, and an inner bottom wall integral with said inner side wall;
      iii. an outer portion comprising an outer side wall, and an outer bottom wall integral with said outer side wall; and,
      iv. means for selectively separating said inner and outer portions from one another;
   b. a tubular filter support nested within a space between said inner and outer side walls;
   c. a filter stowed in a space between said inner bottom wall and said outer bottom wall; and,
   d. means for suspending said filter from a first end edge of said tubular filter support.

15. The kit of claim 14, wherein said separating means comprises a joint disposed adjacent said vessel's upper end.

* * * * *